Jan. 13, 1970  S. M. LOVELESS ET AL  3,489,175

PROGRAMMER WITH CIRCULAR COUNTING DEVICE

Filed May 12, 1967  2 Sheets-Sheet 1

INVENTORS
ROBERT D. EAST
STANLEY M. LOVELESS
BY
Woodhams, Blanchard and Flynn
ATTORNEYS United States Patent Office 3,489,175
Patented Jan. 13, 1970

3,489,175
PROGRAMMER WITH CIRCULAR COUNTING DEVICE
Stanley M. Loveless, Oshtemo Township, Kalamazoo County, and Robert D. East, Galesburg, Mich., assignors to General Gas Light Company, Kalamazoo, Mich., a corporation of Michigan
Filed May 12, 1967, Ser. No. 638,091
Int. Cl. F17d 3/00; G06d 1/02, F16k 31/44
U.S. Cl. 137—624.14        13 Claims

ABSTRACT OF THE DISCLOSURE

A pneumatic programming device having a reciprocal input member and a rotatable ratchet and selector member. The input member is reciprocated by a fluid pressure input signal intermittently imposed thereon and rotatably steps the ratchet unidirectionally in a first direction. After a predetermined number of input signals, the ratchet contacts a reciprocal control member which in turn actuates a control valve whereby an output signal is transmitted through the device. Opening of the control valve automatically resets the device for a new cycle of operation. The selector member permits the ratio of input signals received per output signal transmitted to be selectively varied.

BACKGROUND OF THE INVENTION

Field of the invention

This invention relates to a pneumatic programming device and, in particular, relates to a pneumatic counting device wherein a plurality of input signals is imposed on the device to effect the transmission thereby of a single output signal.

Prior art

While the subject matter of the present invention is applicable to a wide range of systems and situations, it developed out of a need for a device capable of counting or receiving any number of signals, ranging from a very small number to a very large number, with the device transmitting a single output signal on the application of a predetermined number of input signals thereto.

In particular, the device of the present invention is particularly adaptable for use in pneumatic control programming systems used on automatic machine tools. For example, the device of the present invention can be used on an automatically controlled drill press wherein it is desired to form a plurality of identical drilling operations on a single machine blank. If it is desired to sequentially perform six drilling operations on the blank, the device will have imposed thereon six input signals, one for each drilling operation. Upon application of the sixth signal, the device will also transmit an output signal, which signal can be used for any desired purpose such as activating a conveyor device for moving the blank to its next work station. The pneumatic counting device disclosed herein is, however, well suited for other uses and the above example is only for descriptive purposes and is not limiting.

Most prior art counting devices, particularly counting devices for controlling valve operation, have utilized a reciprocating fluid pressure operating device having a pawl member in driving engagement with a driven ratchet wheel, the ratchet wheel being moved sequentially in a series of rotary step-like movements as the fluid pressure operated device is reciprocated. A number of signals or impulses is received on the fluid pressure operated device, causing the ratchet wheel to be moved forward in one direction a number of steps until the output valve is opened. However, these devices generally require that an intermediate linkage be provided between the ratchet wheel and the output valve or else that a port or passage be provided in the ratchet wheel, which port functions as a valve means. These systems result in increased mechanical complexity or create serious sealing problems.

Another problem encountered with prior counting devices is the mechanical complexity involved. Most prior devices have utilized complicated mechanical systems requiring an elaborate control system therefor. These devices are not only expensive to manufacture but also require a great deal of maintenance, thus resulting in an inefficient and undependable operating device. Also, most of the prior devices are not capable of being readily adjusted to obtain a multiplicity of different counting ratios, that is, different values of the number of input signals imposed on the fluid pressure operated device to produce one output signal thereby.

SUMMARY OF THE INVENTION

The pneumatic programming device according to the present invention comprises a housing containing a reciprocal input member, a rotatable ratchet member, a rotatable selector member, and a reciprocal control member. The input member is subjected to a fluid pressure input signal or pulse, which signal causes the input member to be reciprocated. The input member is drivingly engaged with the ratchet whereby the ratchet is rotatably stepped unidirectionally in a first direction in response to the input signal. The ratchet has mounted thereon an abutment member which, after a predetermined number of steps, comes into contact with the control member and moves the same unidirectionally in a first direction. Movement of the control member causes it to come into contact with a control valve member whereby the control valve is moved to an open position allowing the input signal to be transmitted therethrough as an output signal, which is imposed upon an external load. Release of the fluid pressure input signal permits the input member, the ratchet, the control valve and the control member to be returned to their original positions. Return of the ratchet wheel to the original position also permits the control member to return to its original position whereby the control valve is permitted to close such that the system is connected with the low pressure side of the pressure system, as being vented to the atmosphere, thus placing the device in condition for the initiation of a new cycle of operation. The selector member is rotatably adjustable and determines the initial position of the ratchet wheel whereby the ratio between the number of input signals required to produce a single output signal is readily adjustable.

Accordingly, the major objects of the present invention include:

(1) To provide a pneumatic programming device, particularly for counting, wherein a predetermined number of input signals or pulses is imposed on the device for producing one cycle of operation of an output member.

(2) To provide a pneumatic programming device, as aforesaid, wherein a predetermined number of input signals is imposed on the device for transmitting therethrough a single output signal.

(3) To provide a device as aforesaid, which is capable of being readily adjusted to obtain a multiplicity of different ratios between the input and output members.

(4) To provide a device, as aforesaid, in which the input member is reciprocated in response to a plurality of input signals, the input member moving a driven ratchet wheel continuously forward in one direction of rotation until the same contacts and actuates the output member, the ratchet wheel and output member then being returned to their original positions.

(5) To provide a device, as aforesaid, in which the ratchet wheel and input members are permitted to return to their original positions upon actuation of the output member so as to reset the device for the initiation of a new cycle of operation.

(6) To provide a device as aforesaid in which an input signal is imposed upon an input member, which member is moved forward a predetermined distance in response to each signal imposed thereon, the input member driving a ratchet wheel rotatably forward therewith in response to each input signal, the ratchet wheel being engageable with a control member after a predetermined number of input signals whereby said control member is movable to actuate the output member, said output member actuating and automatically controlling the return of said control member, said ratchet, and said input member to their original positions for resetting the device.

(7) To provide a device, as aforesaid, which is readily adaptable for use in combination with other like devices for performing either addition or multiplication operations.

(8) To provide a device, as aforesaid, which is simple in operation, economical to manufacture, and reliable and inexpensive to maintain.

Other objects and purposes of this invention will be apparent to persons acquainted with devices of this type upon reading the following specification and inspecting the accompanying drawings.

Certain terminology will be used in the following description for convenience in reference only and will not be limiting. The words "upwardly," "downwardly," "rightwardly" and "leftwardly" will designate directions in the drawings to which reference is made. The word "forwardly" will refer to the direction of movement of the ratchet wheel or counting member within the device when subjected to input signals and the word "rearward" will refer to the opposite direction. The words "inwardly" and "outwardly" will refer to directions toward and away from, respectively, the geometric center of the device and designated parts thereof. Said terminology will include the words above specifically mentioned, derivatives thereof, and words of similar import.

DETAILED DESCRIPTION

Figure 1:
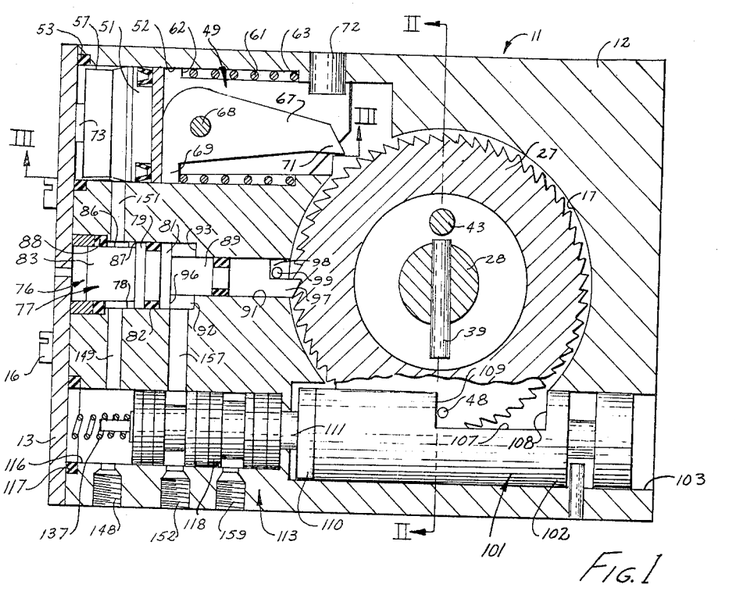
FIGURE 1 is a cross-sectional elevational view of the pneumatic programming device taken along the line I—I of FIGURE 2.
Figure 2:
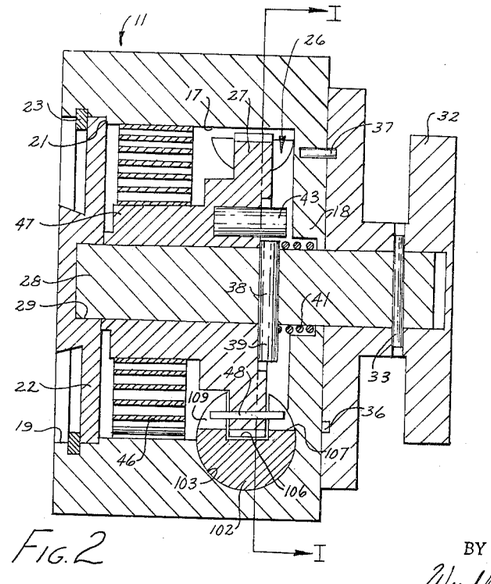
FIGURE 2 is a cross-sectional elevational view taken along line II—II of FIGURE 1.

Referring to FIGURES 1 and 2, there is provided a housing 11 composed of any convenient number of portions. As shown, the housing comprises a main body portion 12 having an end plate 13 connected thereto by any suitable means, such as screws 16. A suitable gasket can be located between the end plate and the main body portion if desired.

The main body portion 12 of the housing 11 has a cylindrical opening 17 formed therein, the end of the opening being closed by means of an end wall 18 which comprises a portion of the housing. The other end of the cylindrical opening 17 is provided with a large recess 19 therearound, the bottom of the recess forming a shoulder 21. A disk-shaped end cap 22 having an enlarged central portion thereon is received within the recess 19 and held in bearing engagement against the shoulder 21 by any suitable means, such as a lock ring 23.

Positioned within the cylindrical opening 17 is a selector control mechanism indicated generally at 26. The selector control mechanism comprises a counting member 27 consisting of a ratchet wheel which is rotatably mounted upon a cylindrical selector rod 28. The selector rod 28 is rotatably mounted within the housing 11, one end of the rod being rotatably received within a recess 29 formed within the end cap 22 with the other end of the rod being rotatably supported in and extending through a circular opening formed in the end wall 18. A selector knob 32 is supported on the extending end of the selector rod 28 and is fixedly secured thereto by means of a transverse pin 33 extending therethrough. The inside face of the selector knob 32 is provided with a plurality of openings 36 angularly spaced thereabout, the openings 36 being of a size so as to receive therein the pin 37 which is fixedly secured to and extends from the end wall 18.

The central portion of the selector rod 28 positioned inside the cylindrical opening 17 is provided with a transverse pin 38 fixedly secured thereto, the ends of the pin 38 extending beyond the periphery of the selector rod with the one end 39 thereof extending substantially beyond the periphery of the rod so as to function as a fixed stop member. A compression spring 41 encircles the selector rod 28 and is positioned between the transverse pin 38 and the end wall 18. One end of the spring 41 bears against the end wall 18 while the other end bears against a thrust washer which in turn bears against the extending ends of the transverse pin 38. The spring 41 thus biases the selector rod inwardly into the cylindrical opening 17 (leftwardly as shown in FIGURE 2), such that the pin 37 is received within one of the openings 36. However, as is clearly shown in FIGURE 2, a substantial axial space exists between the fixed stop 39 and the end wall 18 so as to permit the complete selector mechanism to be axially moved outwardly (rightwardly in FIGURE 2) against the bias of the spring 41 whereby the pin 37 is removed from the hole 36, the selector knob then being rotatable into any desired position so as to align any desired hole 36 with the fixed pin 37 whereupon the spring 41 will again move the selector mechanism inwardly so as to cause the pin 37 to be received within the selected hole 36.

The counting member 27 is provided with an integral extending hub 47 thereon, which hub is freely rotatably mounted on the selector rod 28. The hub of the counting member 27 is restrained from moving axially by being in bearing engagement on opposite ends thereof with the transverse pin 38 and the cap 22 respectively. The counting member 27 is further provided with a pin 43 fixedly secured thereto, which pin axially extends beyond the face of the counting member so as to lie in substantially the same transverse plane as the radial pin 38. The pin 43 fixedly secured to the counting member 27 thus functions as a movable stop member. A torsion spring 46 surrounds the hub portion 47 and has one end thereof fixedly secured to the hub and the other end fixedly secured to the housing 11 to bias the counting member 27 in a return direction (counterclockwise in FIGURE 1) so as to return the counting member to its initial position. The counting member 27 is further provided with an actuating pin 48 transversely extending therethrough adjacent the toothed periphery thereof for a purpose to be explained hereinafter.

Figure 3:
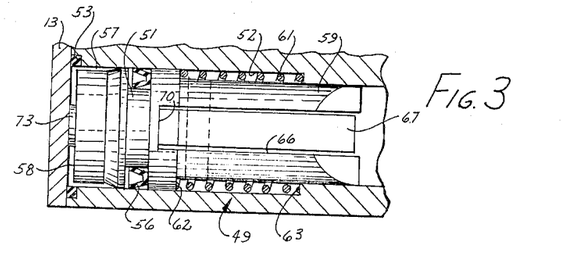
FIGURE 3 is a partial cross-sectional view taken along the lines III—III of FIGURE 1.

The movement of the selector mechanism is controlled by an actuating means indicated generally at 49 located adjacent thereto. The actuating means comprises a piston 51 which is slidably mounted within a cylindrical opening 52 formed in the main body portion 12, the end of the opening being closed by the end plate 13 with an O-ring seal 53 being preferably located between the body portion 12 and the end plate 13. The piston 51 also has a seal 56 positioned therearound intermediate its length, the seal being in snug sliding engagement engagement with the interior wall of the opening 52 whereby the seals 53 and 56 cooperate to define a fluid pressure chamber 57 therebetween. The end of the piston 51 located within the chamber 57 (leftward end as seen in FIGURES 1 and 3) is provided with a transverse pressure face 58 thereon, which face will be acted upon by pressurized fluid when the compartment is filled with the same. The pressure face 58 contains a small projection 73 extending therefrom, which extension abuts against the end plate 13 when the piston is in its retracted position as illustrated in FIGURE 1, the projection 73 thus preventing the pressure face 58 from coming into bearing engagement with the end plate 13.

The other end of the piston 51 (rightward end as viewed in FIGURE 1) is formed as a reduced cylindrical portion 59, which portion has a compression spring 61 surrounding the same, one end of the spring 61 bearing against a shoulder 62 formed on the piston with the other end of the spring bearing against the shoulder 63 formed within the housing. The spring 61 thus biases the piston 51 into its retracted position (leftwardly as illustrated in FIGURE 1).

The piston 51 further contains a longitudinal slot 66 (FIGURE 3) therein, which slot extends the length of the reduced cylindrical portion 59 and further extends slightly into the main body portion of the piston. An actuating pawl 67 is positioned within the slot 66 and is interconnected to the piston 51 by means of a pin 68 which passes through the reduced cylindrical portion 59 and the pawl respectively, whereby the pawl 67 can move angularly with respect to the piston 51. The pawl is provided with an extending tab 69 thereon, the front surface of the tab being in bearing engagement with the compression spring 61 whereby the pawl is biased into an initial position as illustrated in FIGURE 1 such that the rear surface of the tab 69 is in bearing engagement with the bottom surface 70 of the slot 66. The pawl is further provided with a nose 71 thereon which is of a shape adapted to engage with and conform to the teeth formed on the periphery of the counting wheel 27. A guide pin 72 is fixed to the housing and extends into the slot 66 so as to prevent rotational movement of the piston and its associated actuating pawl, the guide pin thus maintaining the actuating pawl in the same plane as the counting member.

The actuating means 49 described above is energized whenever pressurized fluid is injected into the chamber 57 so as to cause the piston 51 to move linearly forwardly (rightwardly as viewed in FIGURE 1) whereby the nose 71 of the pawl 67 comes into engagement with the counting wheel 27 and causes the same to move angularly in a first direction (clockwise in FIGURE 1). When the fluid pressure in the compartment 57 is relieved, the spring 61 will then cause the piston 51 to return to its original position out of engagement with the counting wheel 27.

However, to prevent the counting wheel 27 from returning to its original position due to the action of the torsion spring 46, a latch mechanism 76 is provided for holding or locking the counting wheel 27 in position. The latch mechanism 76 comprises a piston member 77 which is slideably mounted within a cylindrical opening 78 formed in the housing portion 12. The piston 77 has a central body portion comprising a pair of flanges 79 and 81 respectively, the flanges containing an O-ring seal 82 therebetween in sliding engagement with the interior wall of the cylindrical opening 78. The piston 77 further has a first cylindrical portion 83 on one end thereof, which portion is of a smaller diameter than the cylindrical opening 78 so as to form an annular chamber 86 therearound. One end of the chamber 86 is formed by a fixed O-ring seal 88 which is positioned within the housing portion 12 in sliding engagement with the periphery of the cylindrical portion 83 while the other end of the chamber 86 is formed by a transverse pressure face or shoulder 87 formed at the interface between the cylindrical portion 83 and the flange 79.

The other end of the piston 77 is also formed with a cylindrical portion 89 thereon, which portion is slideably received within a reduced cylindrical opening 91 formed within the housing. The cylindrical portion 89 is of a smaller diameter than the cylindrical portion 83 on the other end of the piston and thus results in a formation of a larger annular chamber 92 between the periphery of the cylindrical portion 89 and the interior wall of the opening 78. The ends of the annular chamber 92 are effectively formed by a shoulder 93 formed within the housing and a transverse pressure face or shoulder 96 positioned at the interface between the reduced cylindrical portion 89 and the flange 81. Since the cylindrical portion 89 is of a smaller diameter than the cylindrical portion 83, the pressure face 96 is of a substantially greater area than is the corresponding pressure face 87 contained within the opposite chamber 86. The reduced cylindrical portion 89 is further provided with a tooth 97 on the end thereof, which tooth is engageable with the teeth formed on the periphery of the counting wheel 27 whereby the piston 77 effectively acts as a holdings pawl so as to prevent return movement of the counting member 27. The end of the reduced cylindrical portion 89 is further cut away at 98 to permit a fixed guide pin 99 to pass therethrough thereby preventing rotational movement of the piston member relative to the housing while still permitting the piston to reciprocate relative to the housing so as to permit the nose 97 to be brought into engagement with the teeth on the counting wheel.

Figure 5:
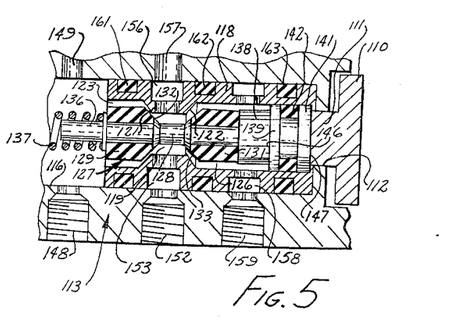
FIGURE 5 is an enlarged sectional view of the output control valve.

Also mounted within the housing 11 closely adjacent the counting wheel 27 is a control mechanism 101 which comprises a cylindrical slide member 102 slideably mounted within a cylindrical opening 103 formed within the main body portion 12. The slide member 102 contains a longitudinal slot 106 therein of a width sufficient to receive the edge of the counting wheel 27 therein as is clearly illustrated in FIGURE 2. The slide member 102 is also formed with a transverse slot 107 formed therein, the slot being bounded by side faces 108 and 109 which are transverse to the longitudinal axis of the slide member. The slot 107 provides the necessary clearance for the actuating pin 48 mounted on the periphery of the counting wheel 27 during the operation of the device. The slide member 102 is provided with an end cap 110 having a reduced cylindrical portion 111 formed thereon in sliding engagement within an opening 112 (FIGURE 5) formed within the housing. The reduced cylindrical portion 111 functions in cooperation with a valve mechanism 113 as described below.

An output valve mechanism 113 (FIGURES 1 and 5) is positioned in coaxial alignment with the slider 102 for actuation thereby. The valve mechanism 113 is positioned within a cylindrical opening 116 formed within the main body portion 12, the end of the opening 116 being closed by the end plate 13 with a suitable O-ring seal 117 being positioned at the interface between the housing portion 12 and the end plate 13. A fixed valve sleeve 118 is positioned within the cylindrical opening 116 and has a longitudinal coaxial central passageway 119 therethrough having oppositely facing conical valve seats 121 and 122 at the ends thereof. The ends of the valve sleeve adjacent the conical valve seats 121 and 122 are formed with the chambers 123 and 126 respectively. Mounted within the fixed valve sleeve is a movable valve member 127 comprising a rod 128 having resilient valve elements 129 and 131 on opposite ends thereof, the valve elements having conical valve faces 132 and 133 respectively formed thereon for sealing engagement with the valve seats 121 and 122 respectively.

The movable valve member 127 is provided with a stub shaft 136 extending from one end thereof having a compression spring 137 surrounding the same, the ends of the spring bearing respectively against the end of the movable valve member 127 and the end plate 13 whereby the movable valve member is biased into the initial position (rightwardly in FIGURE 1) so that the resilient valve element 129 with the conical valve face 132 thereon is normally seated against the fixed valve seat 121. The other end of the movable valve element is provided with an integral piston 138 formed thereon having a pair of flanges 139 and 141 in sliding engagement within the chamber 126, an O-ring seal 142 being positioned between the flanges so as to effectively close or seal the outer end of the chamber 126. One end of the chamber 126 is thus effectively closed by a movable transverse pressure face 146 formed on the flange 139. The other flange 141 defines a transverse end face 147 which cooperates for abutting engagement with the reduced cylindrical portion 111 formed on the end cap 110.

Pressurized fluid is supplied to the actuating mechanism 49, the latch mechanism 76 and the valve mechanism 113 by a plurality of ports and passageways which are formed within the housing portion 12. In particular, the housing is formed with an inlet port 148 therein which communicates with the cylindrical opening 116, which opening is in turn in communication with the chamber 86 by means of a passageway 149 interconnecting therebetween. A similar passageway 151 interconnects the chamber 86 with the chamber 57 surrounding the actuating piston 51. By connecting the inlet port 148 to a suitable source of pressurized fluid, the opening 116 adjacent the movable valve element 127, the chamber 86 surrounding the latch piston 77, and the chamber 57 surrounding the actuating piston 51 are always in communication with and subjected to any pressurized fluid supplied by the source.

The housing is further provided with a load port 152 which is connected to any suitable load or output device which it is desired to subject to a pressure pulse signal. The load port 152 is in communication with the central passageway 119 formed within the fixed valve sleeve 118 by means of a radial port or passageway 153 formed within the valve sleeve. A similar radial passageway 156 is formed within the valve sleeve in communication with the central passageway 119, which radial passageway is in turn in communication with a housing passageway 157 which communicates with the annular chamber 92 of the latch mechanisms.

The housing is formed with a third port 159 therein which functions as an exhaust port and is suitably connected to the low pressure side of the system and could be connected to the atmosphere if desired. The exhaust port 159 is aligned with a radial port 158 formed in the fixed valve sleeve 118, which radial passageway is in turn in communication with the chamber 126 formed within the valve sleeve. The fixed valve sleeve 118 is preferably provided with a plurality of O-ring seals 161, 162, 163 surounding the periphery thereof in sealing engagement with the housing so as to prevent leakage between the related ports and passageways.

Figure 6:
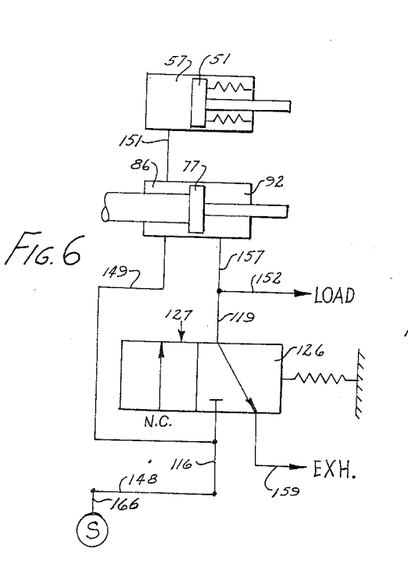
FIGURE 6 is a schematic diagram illustrating pneumatic control circuit for the device.

FIGURE 6 is a schematic diagram illustrating the manifold passages which are formed within the housing 11 for interconnecting and controlling the pistons and control valves therein. As illustrated, a main pressure line 166 is connected from an external fluid pressure source S to the inlet port 148. Fluid passes through the inlet port into the cylindrical chamber 116 so as to bear against the movable control valve 127. Similarly, fluid from the external source passes through the passageway 149 into the latch chamber 86 for biasing the latch piston 77 into engagement with the ratchet wheel. Pressurized fluid then passes from the latch chamber 86 through the passageway 151 into the chamber 57 for actuating the drive piston 51.

The central passageway 119, normally closed by the control valve 127, is interconnected to the load port 152 which in turn is connected to an external load. The control passage 119 is further connected to a passage 157 which is in communication with the latch release chamber 92 for controlling the movement of the latch release piston 77. Passage 119 further communicates with chamber 126 which connects to the exhaust port 159 for exhausting to the low pressure side of the system, such as the atmosphere.

Forward reciprocal movement of the control slide 102 (leftwardly as shown in FIGURE 1) causes the cylindrical end 111 to abut the movable valve element 127, thus causing the valve to be moved to its open position whereby the pressure pulse from the inlet chamber 116 is transmitted through the valve to the load and is further transmitted to the latch release chamber 92 for releasing the holding pawl from engagement with the ratchet wheel. Release of the ratchet wheel permits the spring 137 to return the valve 127 to the normally closed position whereby the latch release chamber 92 and the load line 152 are interconnected to the exhaust line 159.

OPERATION

Figure 4:
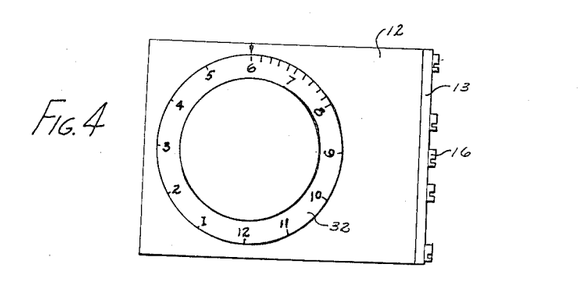
FIGURE 4 is a front elevational view of the device showing the selector knob.

In initiating a cycle of operation of the device, the actuating piston 51, the ratchet wheel 27, and the movable valve element 127 will be in their initial positions. The actuating piston 51 will be urged into abutting engagement with the end plate 13 by means of the spring 61 (as shown in FIGURE 1). The ratchet wheel 27 will likewise be urged by means of the torsion spring 46 into its initial position (counterclockwise in FIGURE 1) whereby the movable stop element 43 will be in abutting enbagement with the fixed stop member 39. The movable valve member 127 will also be urged by the spring 137 rightwardly to the position shown in FIGURE 1 wherein the resilient valve element 129 will be in seating engagement with the valve seat 121 so as to close the central passageway 119 and prevent communication between inlet port 148 and the load port 152. Before initiating operation, the operator will first pull the selector rod 28 axially outwardly (rightwardly in FIGURE 2) until the fixed pin 37 is completely withdrawn from the opening 36 contained within the selector knob. The operator will then rotate the selector knob 32 to the desired angular position so as to select the desired counting ratio. Assuming the operator has rotated the knob to the position 6 as shown in FIGURE 4, the fixed stop element 39 will similarly be rotated into a position whereby a ratio of 6 to 1 will be produced by the device. When the desired ratio has been selected, the operator will then permit the spring 41 to bias the selector rod 28 axially inwardly (leftwardly in FIGURE 2) until the fixed pin 37 is received within the selected knob opening 36. During the above selection process, the nose 97 of the latch piston 77 will not be engaged with the teeth on the ratchet wheel 27 so that the biasing effect of torsion spring 46 will cause the movable stop member 43 to be continuously biased into contact with the selector stop member 39 so as to follow the movement thereof into the desired selected position.

To initiate operation, a first fluid pressure pulse or signal will be transmitted through the main pressure line 166 and the inlet port 148 into the cylindrical chamber 116 and through the passageway 149 into the annular chamber 86 and then through the passageway 151 into the chamber 57 surrounding the actuating piston 51. The presence of the fluid pressurized signal within the chamber 86 will cause the pressurized fluid to bear against the pressure face 87 whereby the latch piston 77 will be moved forwardly (rightwardly in FIGURE 1) such that the nose 97 will be brought into latching engagement with the teeth formed on the periphery of the ratchet wheel 27. Similarly, the presence of a first pressure signal within the chamber 57 will cause the pressurized fluid to act against the pressure face 58 of the actuating piston 51 so as to cause the piston to move forwardly whereby the actuating pawl 67 will engage the teeth of the driven ratchet wheel 27 to cause the same to be rotatably moved in a first direction. The ratchet wheel 27 will be moved forwardly a small angular distance in opposition to torsion spring 46. During this forward movement, the teeth of the ratchet wheel will cam the holding pawl 97 radially outward whereby at least one tooth of the wheel 27 can pass thereby. The pressure in chamber 86 will then cause the pawl 97 to move inwardly to re-engage the teeth of the wheel 27 and thus prevent it from returning to its original position.

During this first step of movement, the movable stop element 43 will move away from and out of contact with the fixed selector stop element 39. Likewise, during the first step of movement the actuating pin 48 will undergo a small angular displacement. Upon release of the first pressure pulse, the spring 61 will cause the piston 51 to return to its initial position out of engagement with the ratchet wheel. However, the holding pawl 97 will be maintained in its engaged position with the ratchet wheel since there is no restoring force acting thereon tending to move the same into its original position.

Similarly, upon the application successive pulses to the device, each of the pulses will cause the piston 51 and its associated actuating pawl 67 to move linearly forward to bring the actuating pawl into engagement with the ratchet wheel so as to move the same forward a one-step distance, the ratchet wheel being held in the new position by means of the holding pawl 97. At the end of the fifth pulse, the actuating pin 48 will have been angularly displaced sufficiently from its initial position so as to be approximately in contact with (as shown in FIGURE 1) the end face 109 of the slot 107 formed within the cylindrical slide member 102. Upon the application of the sixth pressure pulse to the device, the ratchet wheel 27 will be rotatably stepped forward one more step with the actuating pawl 67 maintaining the ratchet wheel in its new position. During the sixth step of movement, the actuating pin 48 will engage the end face 109 of the slot 107 and thus cause the control slide 102 to be linearly moved within the housing (leftwardly in FIGURE 1). Movement of the control slide 102 causes the cylindrical extension 111 thereof to abut the end face 147 of the movable valve element 127 so as to move the valve element 127 against the bias of the spring 137 (leftwardly in FIGURE 1). The leftward movement of the movable valve element 127 will cause the resilient valve element 129 to be moved out of engagement with the valve seat 121 and will simultaneously cause the resilient valve element 131 to be sealingly seated against the conical valve seat 122.

The opening of the control valve 129 will permit the sixth pressure pulse to be also transmitted through the central passageway 119, the radial passageway 153, and the load port 152 into the load line and then through the load line for imposition of the pressure pulse onto an external load. Likewise, the sixth pressure pulse will also be transmitted through the passageways 156 and 157 into the latch release chamber 92. Since the pressure face 96 within the latch chamber 92 is of larger area than the pressure face 87 within the chamber 86, the latch release piston 77 will be moved leftwardly in FIGURE 1 such that the tooth 97 will be withdrawn from engagement with the peripheral teeth on the ratchet wheel, the wheel thus being held in its new position during the sixth pulse solely by the actuating pawl 67. The actuating pawl will maintain this position in engagement with the ratchet wheel throughout the duration of the sixth pressure pulse.

This position will be maintained even after discontinuance of the sixth pressure pulse whereby the pressurized fluid contained in the piston pressure chamber 57 and the latch pressure chamber 86 is exhausted back through the inlet port 148. Similarly, since the control valve 129 is still in the open position, the pressurized fluid from the load line 152 and the latch chamber 92 will also be exhausted back through the inlet 148. This action will continue until the pressure in the chamber 57 acting upon the piston 51 decreases to a level whereby the spring 61 is powerful enough to return the piston 51 to its original position (leftwardly in FIGURE 1). When piston 51 returns to its initial position, torsion spring 46 acting upon the ratchet wheel 27 causes the wheel to angularly move (counterclockwise in FIGURE 1) to its initial position wherein the movable stop pin 43 abuts the fixed stop pin 39.

The return movement of the ratchet wheel 27 to its initial position will cause the actuating pin 48 to leave engagement with the end face 109 formed on the slide member 102. With the actuating pin 48 no longer in engagement with the slide 102, the effect of spring 137 acting upon the end of the movable valve element 127 will cause the valve element 127 and the slide 102 to be moved linearly rightwardly to its initial position as shown in FIGURE 1 whereby the resilient valve element 129 will again be sealingly seated against the conical valve seat 121. In this latter position, the central passageway 119 will be in communication with the chamber 126 which in turn is in communication with the exhaust port 159. This latter position thus permits the latch release chamber 92 and the load line to be in communication with the exhaust port 159 whereby any remaining pressurized fluid is permitted to pass therethrough and is vented to the low pressure side of the system. In this manner, pressure is released from the latch release chamber 92 whereby the loading pawl can again be moved rightwardly into engagement with the ratchet wheel upon the imposition of another pressure pulse thereto.

As described above, the programming device has been subjected to six fluid pressure pulses with only the sixth pulse being transmitted therethrough for imposition, through delay means (not shown) if desired, on an external load. Furthermore, at the completion of the sixth pulse, the device has been returned to its initial position of operation and is thus in condition for initiation of a new cycle of operation. Furthermore, if desired, the operator can readily select the reduction ratio utilized by merely rotating the selector control knob to any position so that the device will only transmit a single pulse to the load for each predetermined number of input pulses applied thereto.

The programmer of the present invention is preferably pneumatically operated since most manufacturing operations have a ready supply of compressed air available. However, the programmer could utilize any type of compressible or noncompressible pressurized fluid.

The programmer of the present invention can also readily be adapted for use in performing either addition or multiplication type of operations. The adaptation of this device for performing such operations is fully explained in copending application Ser. No. 621,542, filed Mar. 8, 1967, and thus will not be further described herein.

It will be recognized that by this invention the programming device, whether used singularly or in combination, can be used to count any number whether large or small, thus resulting in a mechanism having wide adaptability to a great number of different diverse uses. Furthermore, variations in the counting cycle require a minimum of operator effort since the device and the counting cycle can be adjusted simply by rotating an external control knob and does not require any disassembly or modification of the programming mechanism.

Further, the device described is of relatively low cost to build and to maintain. The mechanical structure and its interconnections with the pressurized or pneumatic control system is contained within a very compact housing and is thus very simple to use and to maintain, dependability of operation thus being insured.

Although a particular preferred embodiment has been described for illustrative purposes, it will be recognized that variations or modifications of such disclosure which lie within the scope of the appended claims are fully contemplated.

The embodiments of the invention in which an exclusive property or privilege is claimed are defined as follows:

1. A programming device, particularly a device for counting a predetermined number of fluid-pressure input signals per cycle of operation with said device emitting a single fluid-pressure output signal per cycle of operation, said device comprising:

housing means;

counting means including a counting member movably mounted on said housing means for recording the number of input signals applied to said device;

input piston means mounted in said housing means for reciprocating movement relative thereto;

said housing means having first passageway means therein for permitting imposition of said input signals on said piston means for moving same in a first direction;

coupling means connected to said input piston means and coacting with said counting means for unidirectionally moving said counting member in a step-like manner in a first direction in response to imposition of said input signals on said input piston means;

holding means cooperating with said counting member for normally preventing movement thereof in a second direction opposite said first direction, said holding means including a latch member engageable with said counting member and a latch piston operatively interconnected to said latch member, said latch piston being mounted for reciprocating movement in said housing means;

said housing means having second passageway means therein for permitting imposition of a pressurized fluid on said latch piston for moving said latch member out of engagement with said counting member;

selector means mounted on said housing and coacting with said counting member for selecting said predetermined number of input signals for each cycle of operation of said device;

output means including valve means for emitting a single fluid-pressure output signal per cycle of operation of said device, said output means including third passageway means for supplying a fluid-pressure output signal to said valve means and a fourth passageway means communicating between said valve means and an external load, and means for normally maintaining said valve means in a closed position to prevent communication between said third and fourth passageway means;

means coacting between said counting means and said valve means for transmitting at least a portion of the movement of said counting member to said valve means so as to open said valve means and permit communication between said third and fourth passageway means, thereby permitting said fluid-pressure output signal to be transmitted to said fourth passageway means;

said latch piston having first and second opposed pressure faces thereon with the area of said first pressure face being larger than the area of said second pressure face, said fourth passageway means being in communication with said second passageway means and said second passageway means communicating with said latch piston adjacent said first pressure face whereby the fluid-pressure output signal is imposed on the first pressure face of said latch piston so as to release said latch piston from engagement with said counting member, whereby said device is automatically reset so as to be in condition for initiation of the new cycle of operation; and said housing means further including a fifth passageway means in communication with said first passageway means, said fifth passageway means communicating with said latch piston adjacent said second pressure face whereby said input signal is imposed on said second pressure face.

2. A programming device, particularly a device for counting a predetermined number of fluid-pressure input signals per cycle of operation with said device emitting a single fluid-pressure output signal per cycle of operation, said device comprising:

housing means;

counting means including a counting member movably mounted on said housing means for recording the number of input signals applied to said device;

input piston means mounted in said housing means for reciprocating movement relative thereto;

said housing means having first passageway means therein for permitting imposition of said input signals on said piston means for moving same in a first direction;

coupling means connected to said input piston means and coacting with said counting means for unidirectionally moving said counting member in a step-like manner in a first direction in response to imposition of said input signals on said input piston means;

holdng means cooperating with said counting member for normally preventing movement thereof in a second direction opposite said first direction, said holding means including a latch member engageable with said counting member and a latch piston operatively interconnected to said latch member, said latch piston being mounted for reciprocating movement in said housing means;

said housing means having second passageway means therein for permitting imposition of a pressurized fluid on said latch piston for moving said latch member out of engagement with said counting member;

selector means mounted on said housing and coacting with said counting member for selecting said predetermined number of input signals for each cycle of operation of said device;

output means including valve means for emitting a single fluid-pressure output signal per cycle of operation of said device, said output means including third passageway means for supplying a fluid-pressure output signal to said valve means and a fourth passageway means communicating between said valve means and an external load, and means for normally maintaining said valve means in a closed position to prevent communication between said third and fourth passageway means;

means coacting between said counting means and said valve means for transmitting at least a portion of the movement of said counting member to said valve means so as to open said valve means and permit communication between said third and fourth passageway means, thereby permitting said fluid-pressure output signal to be transmitted to said fourth passageway means;

said valve means including first nad second interconnected valve members, said first valve member being normally closed to prevent communication between said third and fourth passageway means and said second valve member being normally open to permit communication between said second passageway means and an exhaust passageway, simultaneous movement of said first and second valve members by said counting member (1) causing said first valve member to open and permit communication between said second, said third and said fourth passageway means, and (2) causing said second valve member to prevent communication between said second passageway means and said exhaust passageway, whereby said output signal is utilized to release said holding pawl and permit resetting of said device.

3. A programming device, particularly a device for counting a predetermined number of fluid-pressure input signals per cycle of operation with said device emitting a single fluid-pressure output signal per cycle of operation, said device comprising:

housing means;

counting means including a counting member movably mounted on said housing means for recording the number of input signals applied to said device;

input piston means mounted in said housing means for reciprocating movement relative thereto;

said housing means having first passageway means therein for permitting imposition of said input signals on said piston means for moving same in a first direction;

coupling means connected to said input piston means and coacting with said counting means for unidirectionally moving said counting member in a step-like manner in a first direction in response to imposition of said input signals on said input piston means;

holding means cooperating with said counting member for normally preventing movement thereof in a second direction opposite said first direction, said holding means including a latch member engageable with said counting member and a latch piston operatively interconnected to said latch member, said latch piston being mounted for reciprocating movement in said housing means;

said housing means having second passageway means therein for permitting imposition of a pressurized fluid on said latch piston for moving said latch member out of engagement with said counting member;

selector means mounted on said housing and coacting with said counting member for selecting said predetermined number of input signals for each cycle of operation of said device;

output means including valve means for emitting a single fluid-pressure output signal per cycle of operation of said device, said output means including third passageway means for supplying a fluid-pressure output signal to said valve means and a fourth passageway means communicating between said valve means and an external load, and means for normally maintaining said valve means in a closed position to prevent communication between said third and fourth passageway means;

means coacting between said counting means and said valve means for transmitting at least a portion of the movement of said counting member to said valve means so as to open said valve means and permit communication between said third and fourth passageway means, thereby permitting said fluid-pressure output signal to be transmitted to said fourth passageway means;

said housing means further including a vent passageway means and second valve means mounted on said housing means for controlling communication between said fourth and said vent passageway means, and at least one of said fourth and said vent passageway means being in communication with said second passageway means when said second valve means is in at least one of its flow control positions for permitting pressurized fluid to be supplied from said one of said fourth and vent passageway means to said second passageway means for permitting release of said latch member from engagement with said counting member.

4. A programming device, in particular a device for counting a predetermined number of input signals per cycle of operation with said device emitting a single output signal per cycle of operation, said device comprising:

an input means including an input member movable in response to fluid-pressure input signals applied thereto;

counting means responsive to the input signals applied to said input means, said counting means including a counting member guided for rotational movement, said counting member being rotatably movable stepwise unidirectionally from an initial position in response to the application of said input signals to said input means;

coupling means interconnecting said input means to said counting means for effecting said stepwise unidirectional movement of said counting means in a first rotational direction from said initial position in response to application of a predetermined number of said input signals to said input means;

holding means coacting with said counting member for normally preventing rotational movement thereof in a second direction opposite said first direction;

selector means coacting with said counting means for selecting said predetermined number of input signals for each cycle of operation of said device, said selector means including a rotatable cylindrical selector member having a first stop pin extending therefrom, said counting member being rotatably mounted on said selector member and having a second stop pin extending from one face thereof, said first and second stop pins having portions positioned in substantially the same transverse plane;

adjusting means for rotating said selector member into a desired initial position and locking said selector member in said selected position;

valve means coacting with and actuated by said counting means for transmitting therethrough a single fluid-pressure output signal during each cycle of operation of said device;

means including passageways communicating between said input means and said valve means for supplying said fluid-pressure input signals to said valve means, actuation of said valve means by said counting means permitting one of said fluid-pressure input signals to be transmitted through said valve means so as to constitute said output signal;

return means coacting with said counting member for rotatably moving same in said second direction to return same to said initial position after emission of said output signal, said return means including spring means biasing said counting member and its associated stop pin in said second direction so as to move said associated stop pin into engagement with said first stop pin so as to determine said initial position; and means coacting with said holding means for releasing same after emission of said output signal whereby said return means causes said counting member to move in said second direction to return same to said initial position.

5. The device of claim 4, wherein said adjusting means includes a control knob connected to said selector member, said selector member being further mounted for axial movement, and pin-and-slot locking means coacting between said control knob and associated fixed structure for locking said selector member in a desired rotational position when said selector member is in a first axial position, manual movement of said selector member to a second axial position permitting said selector member to be rotated to any desired position to select the number of signals applied to the device during each cycle thereof, and spring means axially biasing said selector member into said first position for rotatably locking said selector member in said desired position.

6. A programming device, in particular a device for counting a predetermined number of input signals per cycle of operation with said device emitting a single output signal per cycle of operation, said device comprising:

an input means including an input member movable in response to fluid-pressure input signals applied thereto;

counting means responsive to the input signals applied to said input means, said counting means including a toothed counting member guided for rotational movement, said counting member being rotatably movable stepwise unidirectionally from an initial position in response to the application of said input signals to said input means;

coupling means including a driving pawl connected to said input member and adapted to engage the teeth of said counting member for effecting said stepwise unidirectional movement of said counting member in a first rotational direction from said initial position in response to application of a predetermined number of said input signals to said input means;

holding means coacting with said counting member for normally preventing rotational movement thereof in a second direction opposite said first direction, said holding means including a holding latch member adapted to engage the teeth of said counting member;

means coacting with said holding means for urging said latch member into engagement with the teeth of said counting member during operation of the device for preventing rotational movement of said counting member in said second direction;

selector means including a rotatable selector member coacting with said counting means for selecting said predetermined number of input signals for each cycle of operation of said device;

valve means coacting with and actuated by said counting means for transmitting therethrough a single fluid-pressure output signal during each cycle of operation of said device;

means including passageway communicating between said input means and said valve means for supplying said fluid-pressure input signals to said valve means, actuation of said valve means by said counting means permitting one of said fluid-pressure input signals to be transmitted through said valve means so as to constitute said output signal;

return means coacting with said counting member for rotatably moving same in said second direction to return same to said initial position after emission of said output signal; and means coacting with said holding means for releasing same after emission of said output signal whereby said return means causes said counting member to move in said second direction to return same to said initial position.

7. A device according to claim 6, wherein said counting member comprises a rotatably mounted ratchet wheel having teeth thereon, and said return means includes spring means rotatably biasing said ratchet wheel toward said initial position;

said holding means comprising releasable latch means including said latch member engageable with said ratchet wheel for holding same after said ratchet wheel has been moved by said input means in response to the application of input signals thereto, said latch means also including a piston connected to said latch member and having first and second pressure faces thereon with said first pressure face having a larger area than said second pressure face;

means for imposing said input signals on said second pressure face for causing said latch member to engage said ratchet wheel; and means for imposing said output signal on said first pressure face for causing said latch member to disengage the ratchet wheel.

8. A device according to claim 6, wherein said valve means includes a first valve and means biasing same into a normally closed position, said counting member being driven in said first rotational direction by said input means and engaging said first valve after application of said predetermined number of input signals for opening said first valve whereby one of said input signals is transmitted therethrough as said output signal;

said holding means further including a fluid-actuated latch piston interconnected to said holding latch member for releasing said latch member from engagement with said counting member, and communication means interconnecting said first valve and said fluid-actuated piston for supplying said output signal to said latch piston for moving said latch piston and said latch member out of engagement with said counting member to permit same to return to its initial position; and said valve means further including a second valve normormally biased into an open position and being movable into its closed position simultaneously with movement of said first valve into its open position, said second valve providing communication between said communication means and an exhaust passageway when in its normally open position, said second valve returning to its initial, normally open position when said counting member returns to its initial position whereby the fluid-pressure output signal applied to the latch piston is relieved to permit the latch member to again engage the counting member.

9. A device according to claim 8, wherein said latch piston is provided with a pair of opposed pressure faces thereon, said output signal being imposed against one of said pressure faces for moving said latch member out of engagement with said counting member, and means for imposing said input signals to the other pressure face for causing said latch member to be moved into engagement with said counting member.

10. A programming device, particularly a device for counting a predetermined number of fluid-pressure input signals per cycle of operation with said device emitting a single fluid-pressure output signal per cycle of operation, said device comprising:

housing means having a bore formed therein;

counting means including a rotatable counting member movably mounted on said housing means for recording the number of input signals applied to said device;

input piston means mounted in said housing means for reciprocating movement relative thereto;

said housing means having first passageway means therein for permitting imposition of said input signals on said piston means for moving same in one direction away from an initial position;

coupling means connected to said input piston means and including a driving member drivingly coacting with said counting member for unidirectionally moving said counting member in a step-like manner in a first rotational direction in response to imposition of said input signals on said input piston means;

holding means cooperating with said counting member for normally preventing movement thereof in a second rotational direction opposite said first direction, said holding means including a latch member engageable with said counting member and a latch piston interconnected to said latch member, said latch piston being mounted for reciprocating movement in said housing means;

return means continuously urging said input piston means in another direction opposite said one direction for returning said input piston means to said initial position when each fluid-pressure input signal is relieved, the return movement of said input piston means to said initial position also causing relative movement between said driving member and said counting member;

said housing means having second passageway means therein for permitting imposition of a pressurized fluid on said latch piston for moving said latch member out of engagement with said counting member;

selector means mounted on said housing and coacting with said counting member for selecting said predetermined number of input signals for each cycle of operation of said device, said selector means including a selector member rotatably mounted on said housing means and having a shaft portion extending into said bore, said rotatable selector member further having a first stop member fixedly secured thereto and rotatable therewith;

said counting member comprising a rotatable ratchet wheel positioned within said bore and rotatably mounted on said shaft portion, said ratchet wheel having a second stop member fixedly secured thereto and adapted to contact said first stop member in a selected rotational position;

torsion spring means coacting between said ratchet wheel and said housing means for urging said ratchet wheel in a second rotational direction opposite said first direction for urging said second stop member into a position whereby same will contact said first stop member;

said selector means including adjustment means for permitting the number of input signals per cycle of operation of said device to be selectively varied, said adjustment means including a plurality of circumferentially spaced openings formed on one of said selector member and housing means and a projecting member mounted on the other of said selector member and housing means with said projecting member being adapted to extend into one of said openings for selecting said predetermined number of input signals;

output means including valve means for emitting a single fluid-pressure output signal per cycle of operation of said device, said output means including third passageway means for supplying a fluid-pressure output signal to said valve means and a fourth passageway means communicating between said valve means and an external load, and means for normally maintaining said valve means in a closed position to prevent communication between said third and fourth passageway means; and means coacting between said counting means and said valve means for transmitting at least a portion of the movement of said counting member to said valve means so as to open said valve means and permit communication between said third and fourth passageway means, thereby permitting said fluid-pressure output signal to be transmitted to said fourth passageway means.

11. A programming device according to claim 10, wherein said first and third passageway means are in communication with one another whereby said input signals are supplied to both said input piston means and said valve means, actuation of said valve means by said counting member thus causing one of said input signals to be transmitted through said valve means into said fourth passageway means so as to constitute said output signal.

12. A device according to claim 10, wherein said rotatable selector member is axially movable relative to said housing means between first and second axial positions, said projecting member extending into one of said openings when said selector member is in said first axial position, axial movement of said selector to said second axial position causing said projecting member to be removed from said one of said openings for permitting said selector member to be rotatably moved to permit said predetermined number of input signals to be selectively varied.

13. A programming device, particularly a device for counting a predetermined number of fluid-pressure input signals per cycle of operation with said device emitting a single fluid-pressure output signal per cycle of operation, said device comprising:

housing means;

counting means including a counting member movably mounted on said housing means for recording the number of input signals applied to said device, said counting member comprising a toothed wheel rotatably mounted on said housing means;

input piston means mounted in said housing means for reciprocating movement relative thereto;

said housing means having first passageway means therein for permitting imposition of said input signals on said piston means for moving same in one direction away from an initial position;

coupling means connected to said input piston means and including a driving member drivingly coacting with said counting member for unidirectionally moving said counting member in a step-like manner in a first rotational direction in response to imposition of said input signals on said input piston means;

torsion spring means coacting between said toothed wheel and said housing means for urging said wheel in a second rotational direction opposite said first direction;

holding means cooperating with said counting member for normally preventing movement thereof in said second rotational direction, said holding means including a latch member engageable with said counting member and a latch piston interconnected to said latch member, said latch piston being mounted for reciprocating movement in said housing means;

return means including first spring means coacting between said input piston means and said housing means for continuously urging said input piston means in another direction opposite said one direction for returning said input piston means to said initial position when each fluid-pressure input signal is relieved, the return movement of said input piston means to said initial position also causing relative movement between said driving member and said counting member;

said housing means having second passageway means therein for permitting imposition of a pressurized fluid on said latch piston for moving said latch member out of engagement with said counting member;

selector means mounted on said housing and coacting with said counting member for selecting said predetermined number of input signals for each cycle of operation of said device;

output means including valve means for emitting a single fluid-pressure output signal per cycle of operation of said device, said output means including third passageway means for supplying a fluid-pressure output signal to said valve means and a fourth passageway means communicating between said valve means and an external load, and means for normally maintaining said valve means in a closed position to prevent communication between said third and fourth passageway means;

means coacting between said counting means and said valve means for transmitting at least a portion of the movement of said counting member to said valve means so as to open said valve means and permit communication between said third and fourth passageway means, thereby permitting said fluid-pressure output signal to be transmitted to said fourth passageway means;

said housing means including first, second and third bores formed therein with said bores having substantially parallel axes, said input pistons means being slideably received within said first bore, said latch piston being slideably received within said second bore, and said valve means including a movable valve member positioned within said third bore, said housing means also including a fourth bore formed therein and having an axis substantially tranverse to the axes of said first, second and third bores, said toothed wheel being positioned within said fourth bore and rotatable about the axis thereof, and said selector means including a selector member mounted on said housing means for rotation about the axis of said fourth bore; said rotatable selector member having a first abutment member thereon with said first abutment member being selectively positionable relative to said housing means in one of a plurality of positions, and means maintaining said selector member and said first abutment member in said selected position; and a second abutment member operably interconnected to said counting member and rotatable therewith, said second abutment member being adapted to contact said first abutment member, said torsion spring means normally urging said wheel and said second abutment member in said second rotational direction so as to cause said second abutment member to contact said first abutment member.

References Cited

UNITED STATES PATENTS

| | | | |
|---|---|---|---|
| 1,908,626 | 5/1933 | Ford | 235—132 XR |
| 2,721,701 | 10/1955 | Hardesty et al. | |
| 3,028,050 | 3/1962 | Nelson | 137—624.15 XR |
| 3,272,146 | 9/1966 | Bennett et al. | 137—624.14 XR |
| 3,323,721 | 6/1967 | Topfer et al. | 235—132 XR |
| 3,345,915 | 10/1967 | Dotto | 137—624.14 XR |
| 3,371,863 | 3/1968 | Bickford et al. | 235—201 |

ROBERT G. NILSON, Primary Examiner

U.S. Cl. X.R.

137—624.15; 235—132; 251—230